United States Patent Office 3,392,388
Patented July 9, 1968

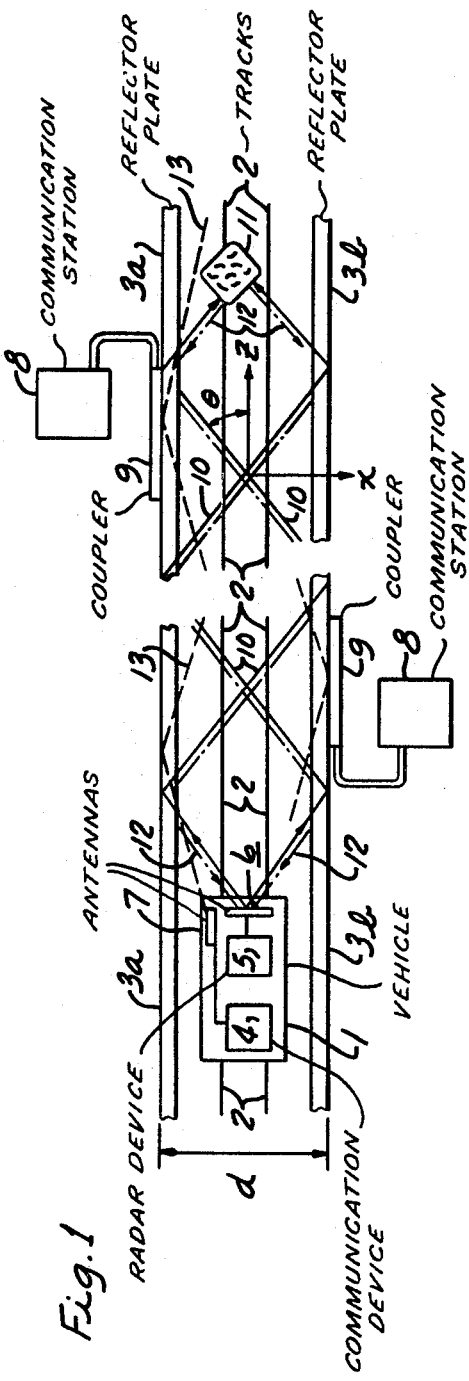
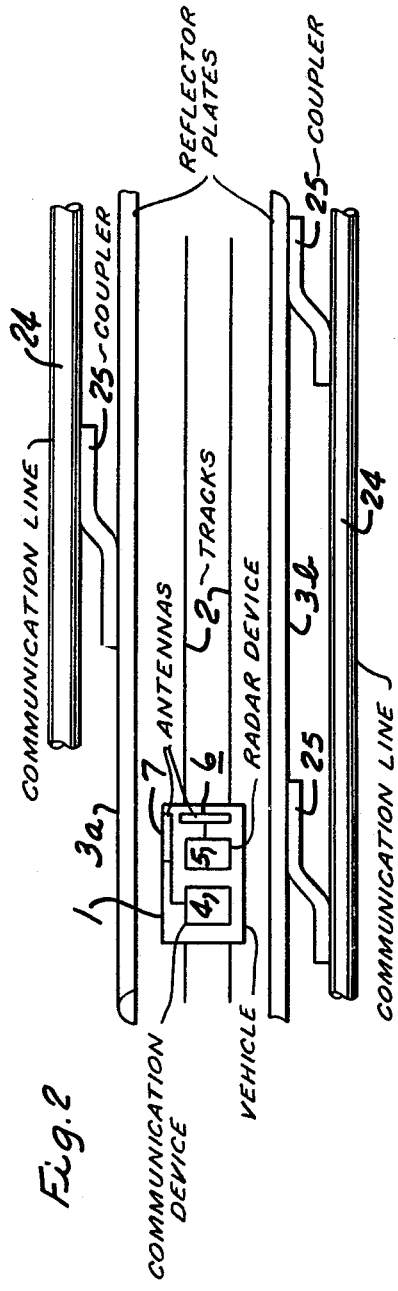

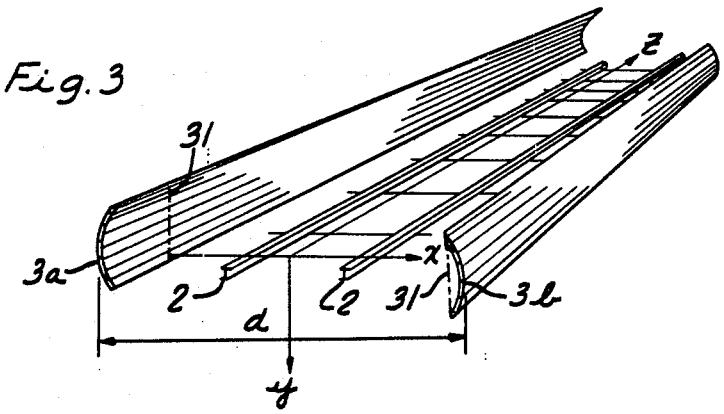
Fig. 3
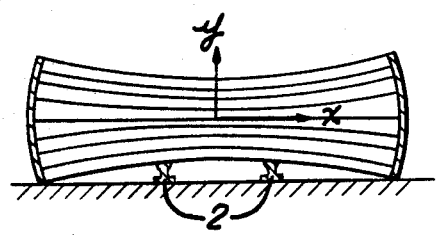
Fig. 4
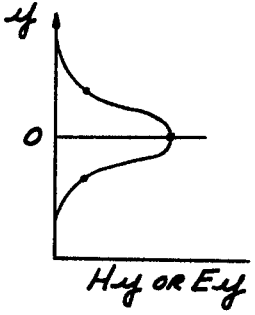
Fig. 5
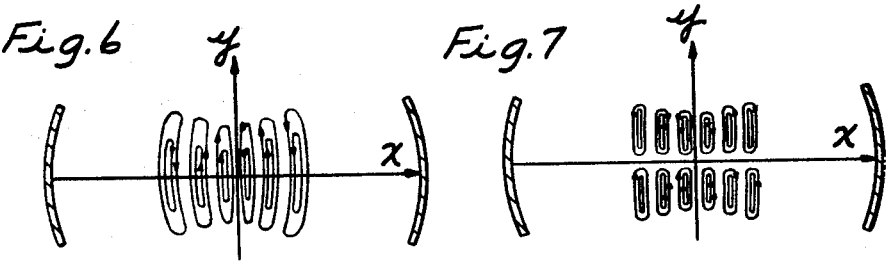
Fig. 6
Fig. 7

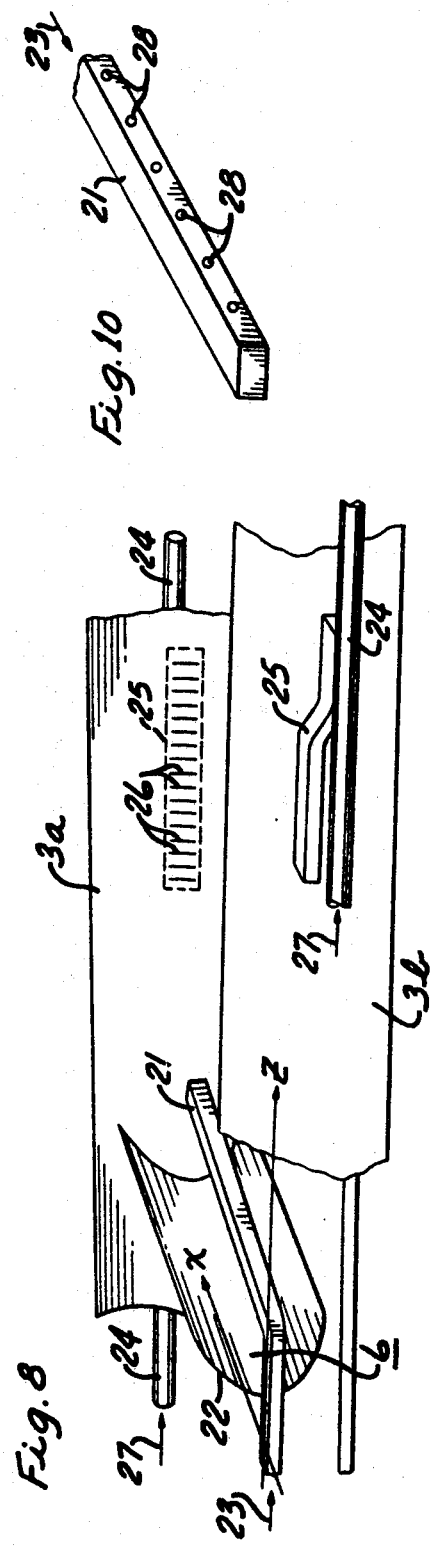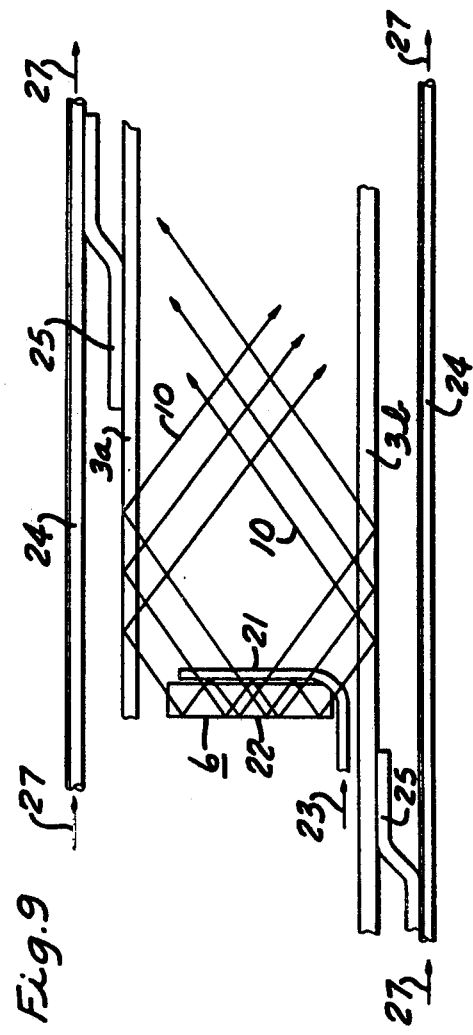

3,392,388
COMBINATION SYSTEM FOR OBSTACLE
DETECTION AND COMMUNICATION
FOR VEHICLES
Tsuneo Nakahara, Nishinomiya, Noritaka Kurauchi, Suita,
Taichiro Nagao, Osaka, and Masao Hoshikawa, Nishinomiya, Japan, assignors to Sumitomo Electric Industries, Ltd., Osaka, Japan, a company of Japan
Filed Dec. 23, 1965, Ser. No. 515,840
Claims priority, application Japan, Dec. 28, 1964,
39/74,133; Apr. 23, 1965, 40/24,018
15 Claims. (Cl. 343—6.5)

ABSTRACT OF THE DISCLOSURE

The invention utilizes electromagentic wave beam transmission lines, which are installed parallel to both sides of the track of vehicles, in order to detect obstacles, communicate between vehicles, and communicate between a vehicle and a fixed station.

---

This invention relates to a combination system of radar and communication to be used as a detector of obstacles for advanced warning to ensure safety of a vehicle such as a train on a track, using an electromagnetic wave beam transmission line consisting of reflector-plates of a conductor installed in parallel with the track and on both sides of the track for the vehicle and to be used also for communication between vehicles or between a vehicle and a fixed station by using said electromagnetic wave beam transmission line.

The prior art for a train control system making use of ultra high frequency waves such as used here, consists of a surface wave radar system using a surface wave transmission line. This surface wave radar system is a surface wave transmission line installed along the track and a radar device provided on board the vehicle. A signal wave is transmitted from the radar transmitter and propagated along the surface wave transmission line to detect reflected waves from an object existing in the neighborhood of the track. Information on the location and size of the object is obtained from the time required for reflection and the intensity of reflected wave, the train being thus controlled by means of an automatic control device.

However, this surface wave radar system has a shortcoming in that the range of detection is limited to the proximity of the line because the energy of electromagnetic field concentrates in the proximity of the surface wave transmission line.

As a communication system for train control, a waveguide train control communication system utilizing a leaky waveguide installed along the railroad track is also known in the art. According to this system, a leaky waveguide is installed along the railroad track. A leaky wave is caused to radiate from said leaky waveguide uniformly over the track. Sending and receiving antennas are provided aboard the train to couple with this leaky wave for communication between a fixed station and the train or between trains. However in this communication system the electromagnetic signal wave is mostly radiated into the space in the form of a leaky wave, so that the wave, other than the portion coupled with the antenna of the running train, is wasted. The transmission loss of the leaky waveguide is so great that it has been found unsuitable for a long distance line from an economical point of view.

The principal object of the present invention is to provide a combination system for obstacle detection and communication, in which an electromagnetic wave beam transmission line installed in parallel with the track of vehicles, is used as a propagation line for radar waves for obstacle detection, making it possible to detect obstacles in larger areas than was possible by the surface wave line heretofore used, and in which, at the same time, the electromagnetic beam transmission line for obstacle detection is also being used as a communication line between vehicles and between a vehicle and a fixed station.

Another principal object of the present invention is to provide a combination system for obstacle detection and communication with little transmission loss of the electromagnetic communication wave, in which a low loss transmission line for communication is provided in parallel with an electromagnetic wave beam transmission line. The electromagnetic wave beam transmission line consists of concave reflector plates positioned along the direction of the track and are installed facing each other on both sides of the track and in parallel with the track. The electromagnetic wave beam transmission line with the low loss transmission line are coupled by couplers at suitable intervals. The composite transmission line made in this way is used both as the transmission line for a radar wave for obstacle detection and as the transmission line for communication waves of the vehicle. This eliminates, for the most part, the wasteful leakage of wave energy into space as occurs in the heretofore employed communication system for train control using a leaky waveguide. The present invention makes effective use of the wave by partially coupling it from the low loss transmission line for communication exclusively to the electromagnetic wave beam transmission line and by captivating the wave within the electromagnetic wave beam transmission line.

Another object of the present invention is to provide a combination system for obstacle detection and communication in which the transmission mode of the obstacle detecting radar wave emanated by the vehicle and the transmission mode of the communication wave are made different from each other, so that no interference takes place, even if two waves exist in mixture on one and the same electromagnetic wave beam transmission line.

Another object of the present invention is the provision of a combination system for obstacle detection and communication in which a TE mode is used for the radar wave of the obstacle detecting device and a TM mode is used for the communication wave.

Another object of the present invention is to provide an antenna suitable for sending and receiving the TE mode waves on an electromagnetic wave beam transmission line.

Another object of the present invention is to provide a coupler suitable for sending and receiving the TM mode waves on an electromagnetic wave beam transmission line.

Another object of the present invention is to provide a mode filter which can separate two wave modes, TM and TE, on an electromagnetic wave beam transmission line.

FIGURE 1 is a plan view illustrating an obstacle detecting and communicating system for a vehicle using an electromagnetic wave beam transmission line according to the present invention.

FIGURE 2 is a plan view illustrating an obstacle detecting and communicating system for a vehicle using a composite transmission line comprising an electromagnetic wave beam transmission line and a low loss communication line according to the present invention.

FIGURE 3 is a perspective view illustrating an example of the electromagnetic wave beam transmission line used in the embodiment of the present invention.

FIGURE 4 is a transverse cross-sectional view qualitatively illustrating the equipotential lines of a $TE_{no}$ or $TM_{no}$ wave propagating along the electromagnetic wave beam transmission line shown in FIGURE 3.

FIGURE 5 is a graphical illustration qualitatively showing the distribution of electromagnetic field intensity of the basic $TE_{no}$ wave or $TM_{no}$ wave illustrated in FIGURE 4.

FIGURES 6 and 7 are transverse cross-sectional views qualitatively illustrating the propagation modes in the electromagnetic wave beam transmission line shown in FIGURE 3.

FIGURE 8 is a perspective view illustrating the antenna for exciting or receiving radar wave, $TE_{no}$ wave, on the electromagnetic wave beam transmission line of the present invention and the coupler between an electromagnetic wave beam transmission line and a low loss communication line for exciting or receiving a communication wave, $TM_{no}$ wave.

FIGURE 9 is a plan view showing the radiation of a radar wave from the radar wave exciter illustrated in FIGURE 8.

FIGURE 10 is a perspective view illustrating the construction of the primary radiator of the radar wave antenna shown in FIGURE 9.

Figure 11:
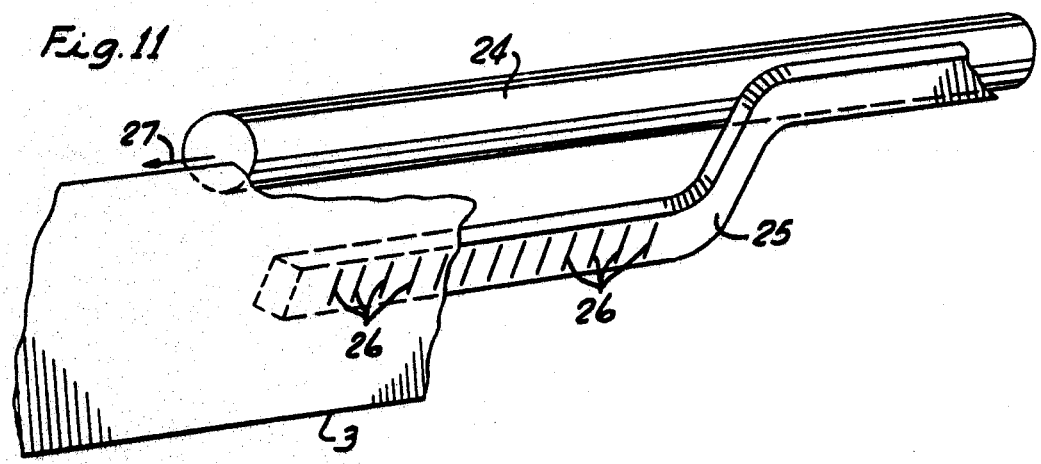
FIGURE 11 is a partially cut away perspective view of a coupler for coupling the low loss communication line and the electromagnetic wave beam transmission line shown in FIGURE 2, FIGURE 8 and FIGURE 9.

Referring to the drawings:

FIGURE 1 shows the combination system for obstacle detection and communication for vehicles using the electromagnetic wave beam transmission line of the present invention. 1 denotes a vehicle, 2 the track on which the vehicle travels, 3a and 3b the reflector-plates of a conductor of the electromagnetic wave beam transmission line, 4 the communication device, 5 the obstacle detecting device, 6 the exciter-and-receiving antenna coupled with the obstacle detecting device, 7 the exciter-and-receiving antenna coupled with the communication device, 8 the fixed station for communication, 9 the coupler for coupling the fixed station of the communication system and the electromagnetic wave beam transmission line, 10 the electromagnetic wave transmitted from the transmitter of the radar device, 11 the obstacle existing on the track 2 of the vehicle, 12 the reflected wave which is a part of the transmitted wave that has been reflected by the obstacle, and 13 the electromagnetic wave used for the communication system.

In FIGURE 1, reflector plates 3a and 3b of a conductor are installed facing each other on both sides of the track 2 to form an electromagnetic wave beam transmission line. When the radar device 5 provided aboard the vehicle 1 sends the wave 10 to the electromagnetic wave beam transmission line from the exciter-and-receiving antenna coupled with the radar device, the wave 10 propagates forward ahead of vehicle, reflecting at a constant angle between the reflector plates 3a and 3b of the electromagnetic wave beam transmission line as qualitatively shown in FIGURE 1. In case an obstacle 11 exists on the track 2 of the vehicle, a part of the transmitted wave 10 is reflected by that obstacle and produces reflected wave 12. A part of this reflected wave 12 comes back, reflecting alternately between the reflector-plates of the electromagnetic wave beam transmission line at the same reflection angle as the transmitted wave. The reflected wave 12 is received by the exciter-and-receiving antenna 6 and is sent to the radar device 5. The size of the obstacle and the distance from the vehicle 1 to the obstacle 11 can be known from the information of the reflected wave.

On the other hand, it is possible with the communication system to communicate between vehicles or between a vehicle and a fixed station. This will be explained with reference to FIGURE 1. The communication device 4 provided aboard the vehicle 1 is provided with a sending and receiving device. When sending a message, the communication wave 13 is radiated to the electromagnetic wave beam transmission line via the antenna 7 for communication and propagates reflecting between the reflector-plates 3a and 3b. If there is another vehicle, it is coupled with the antenna for communication of that vehicle. Conversely, the wave can be propagated from another vehicle towards this vehicle along the electromagnetic wave beam transmission line. It is thus possible to communicate between vehicles. Likewise it is possible to communicate also between a vehicle and a fixed station. The wave 13 is caused to propagate along the electromagnetic wave beam transmission line from the communication device 4 aboard the vehicle 1 via the antenna 7, and the wave 13 is transmitted to the fixed station 8 via the coupler 9 provided to couple with the electromagnetic wave beam transmission line. The transmitted wave from the fixed station 8 is coupled with the antenna 7 of the vehicle 1 via the electromagnetic wave beam transmission line and is received by the communication device 4. In case there is a long distance between vehicles or between a vehicle and a fixed station, great attenuation will take place in the signal. Therefore, the fixed station 8 may be a repeater station, and, where signals of the communication system attenuate, a number of repeater stations may amplify such signals repeatedly to transmit them to the destination.

FIGURE 2 shows the electromagnetic wave beam transmission line of the present invention installed along the track 2 with a low loss communication line 24. In order to enhance communication efficiency still further, only the wave of the communication system is caused to propagate on the low loss communication line 24 installed along with the electromagnetic wave beam transmission line and communication signals are radiated from the communication line to the electromagnetic wave beam transmission line via couplers 25 which couple the communication line 24 and the electromagnetic wave beam transmission lines 3a and 3b intermittenly, the signals radiated propagating on the electromagnetic wave beam transmission line and being received by the antenna of the vehicle. That is to say, the wave for communication of signals propagating on the communication line is radiated by the couplers 25 installed intermittently along the track 2 to the electromagnetic wave beam transmission line for the whole length of the track 2, so that the intensity of electromagnetic field of the communication signals propagating on the electromagnetic wave beam transmission line may be made constant throughout the whole length of the electromagnetic wave beam transmission line. It thus makes it possible to keep the receiving level of the antenna of the vehicle almost constant irrespective of the location of the vehicle. Also with regard to communication from a vehicle to a fixed station, propagation takes place in the route opposite to that explained above, so that the receiving level of the fixed station likewise remains almost unchanged no matter what the location of the vehicle on the track. When a low loss transmission line 24 is combined with the electromagnetic wave beam transmission line 3 as shown in FIGURE 2, there is the advantage that there is less attenuation of communication wave than in the case where only the electromagnetic wave beam transmission line is used as shown in FIGURE 1. Compared with the aforementioned communication system using the leaky waveguide, the wave here is caught by the electromagnetic wave beam transmission line, while the wave leaking from the leaky waveguide is radiated widely into space. In the case of the system comprising this invention, the wave is not radiated wastefully. The energy is utilized efficiently and makes it possible to lower the output power of the transmitter of the communication device.

FIGURE 3 shows an example of the application of the electromagnetic wave beam transmission line used for the present invention shown in FIGURE 1 and FIGURE 2.

In the example of application shown in FIGURE 3, a pair of reflector-plates 3a and 3b of a conductor with a concave surface which are long in the direction of the track 2, are installed along both sides of the track of vehicles in parallel with the track with the concave surfaces facing each other. In FIGURE 3, rectangular coordinates are utilized for illustrative purposes in a horizontal plane parallel to the plane of the tracks as the X–Z plane and a vertical axis crossing the X–Z plane at right angles referred to as the y-axis. The two curves of the reflector plates 3a and 3b are parabolas having their concavity facing each other in the xy plane of said coordinates and thus are arcuate in cross-section with their chords 31 facing each other. These arcuate sections or conics are in a confocal condition. As mentioned, these reflector plates 3a and 3b are parallel with the tracks.

In the case of the electromagnetic wave beam transmission line shown in FIGURE 3, the wave propagates as a plane wave at a velocity in free space in the direction of and fixed inclination to the z-axis, is reflected by the reflector plate 3a, for instance, and is again reflected by the reflector plate 3b. Thus the wave propagates in the direction of the z-axis, repeating reflections between these reflector plates having concave arcuate surfaces. By the action of the concave surfaces of the reflector plates, the wave converges in the direction of the y-axis. The wave is consequently caught between the concave reflector plates and forms an electromagnetic beam. FIGURE 4 shows qualitatively the equipotential curves of the basic mode, $TE_{no}$ or $TM_{no}$, of the wave propagating as caught in a beam form between the opposing reflector plates 3a and 3b of the electromagnetic wave beam transmission line shown in FIGURE 3. FIGURE 5 shows the distribution of the electric field intensity $Ey$ or magnetic field intensity $Hy$ in the direction of and as a function of the distance along the y-axis of the electromagnetic wave beam transmission line.

As shown in FIGURE 5, the electromagnetic field propagating along the electromagnetic wave beam transmission line is of a distribution along the y-axis of an exponential function $\exp(-ay^2)$ (where $a$ is a constant).

Representative modes of the propagation modes are illustrated in FIGURE 6 and FIGURE 7. The mode shown in FIGURE 6 is one of the basic modes of low loss. The electric field of a $TE_{no}$ mode or the magnetic field of a $TM_{no}$ mode is represented. FIGURE 7 shows the electric field of a $TE_{n1}$ mode or the magnetic field of $TM_{n1}$ mode.

In case an electromagnetic wave beam transmission line is used for both an obstacle detecting system and a communication system, there takes place the following problems.

(1) Generally speaking, the energy of the radar wave is great and that of the communication wave is small, so that the radar wave finds its way into the receiving part of the communication device aboard the vehicle via the antenna of the vehicle resulting in interference.

(2) The radar wave couples from the electromagnetic wave beam transmission line to the low loss communication line at the coupler and interferes with the communication wave and at the same time results in an increase loss of the radar wave itself.

(3) In the case where only the communication wave is primarily absorbed and attenuated, for as example at the coupler where the transmission line couples with the electromagnetic wave beam transmission line, the radar wave will also be absorbed and attenuated.

In order to eliminate the above-mentioned various shortcomings, the present invention uses electromagnetic wave beam $TE_{no}$ mode for the radar wave and electromagnetic wave beam $TM_{no}$ mode for the communication wave in a radar-and-communication system consisting of an electromagnetic wave beam transmission line comprising reflector-plates having concave inner surfaces placed facing each other along the track and a low loss communication line installed in parallel with said transmission line coupled together, completely eliminating said interference of the radar wave with the communication wave.

The diffraction loss and thermal loss of $TE_{no}$ mode and $TM_{no}$ mode may be compared by the following formulae.

For $TE_{no}$ wave:

$$\text{Diffraction loss } \alpha_r = \frac{\delta \tan \theta}{2d} \text{ neper/m.}$$

where:

$$\log_{10} \delta \simeq -5N_o \sin \theta + 0.8$$

$$N_o = \frac{2a^2}{d\lambda_o} \text{ (Fresnel number)}$$

$$\text{Thermal loss } \alpha_t = \frac{2R_s \sin^2 \theta}{Z_o d \cos \theta} \text{ neper/m.}$$

where:

$\theta$ = angle between plane wave and transmission axis
$d$ = distance between reflector-plates of the electromagnetic wave beam transmission line
$2a^2$ = width of the reflector-plates of the electromagnetic wave beam transmission line
$\lambda_o$ = free space wavelength
$R_s$ = surface resistance of the reflector plate
$Z_o$ = free space impedance For $TM_{no}$ wave:

$$\text{Diffraction loss } \alpha_r = \frac{\delta \tan \theta}{2d} \text{ neper/m.}$$

$$\log_{10} \delta \simeq -5N_o \sin \theta + 0, 8, N_o = \frac{a^2}{d\lambda_o}$$

$$\text{Thermal loss } \alpha_t = \frac{2R_s}{Z_o d \cos \theta} \text{ neper/m.}$$

If the above-mentioned losses of the $TE_{no}$ wave and the $TM_{no}$ wave are compared, the following is found: With regard to the diffraction loss ($\alpha_r$), both are the same. With regard to the thermal loss ($\alpha_t$), however, that of $TM_{no}$ wave is slightly larger than that of $TE_{no}$ wave. In consequence, total transmission loss is larger with $TM_{no}$ wave than with $TE_{no}$ wave. As a radar wave for obstacle detection, either the $TM_{no}$ wave or $TE_{no}$ wave may be used. For instance, by using the $TE_{no}$ wave for the radar wave and $TM_{no}$ wave for the communication wave, it is possible to eliminate the interference of the obstacle detecting radar system with the communication system and let both systems function simultaneously, making use of one electromagnetic wave beam transmission line for two waves simultaneously.

The antenna or the coupler for exciting waves of these two modes on the electromagnetic wave beam transmission line and receiving waves of these modes is described as follows:

FIGURE 8 is a perspective view of an exciting-and-receiving antenna for obstacle detection and a coupler for the communication system using a composite transmission line comprising the electromagnetic wave beam transmission line and the low loss wave-guide of the present invention.

In FIGURE 8, radar feeding wave 23 is fed to the primary radiator 21. The primary radiator 21 is a slot array antenna which is a rectangular wave-guide having slots 28 provided at equal intervals on its narrow wall as shown in FIGURE 10. The secondary radiator 22 is a parabolic cylinder reflector.

FIGURE 9 is a plan view of FIGURE 8. In FIGURE 9, radar feeding wave 23 is radiated in two directions at equal angles from the openings of the primary radiator 21 shown in FIGURE 10, and is converged in y axis by the secondary radiator into radar wave 10 which propagates reflecting between the reflector-plates 3a and 3b of the electromagnetic wave beam transmission line.

For communication on the other hand, the communication wave 27 propagating on the low loss transmission line, as shown in FIGURES 8 and 11, is coupled to the electromagnetic wave beam transmission line via couplers 25 attached intermittently to the electromagnetic wave beam transmission line. The coupler has openings 26 of slits cut in the y-direction and arranged side by side in the z-direction at intervals shorter than the wavelength along the center of the reflector-plate. The communication wave 27 is radiated as $TM_{no}$ wave to the electromagnetic wave beam transmission line via this coupler. This coupler effectively receives the $TM_{no}$ communication wave. Nevertheless, the $TE_{no}$ radar wave is not coupled but passes this coupler.

Figure 12:
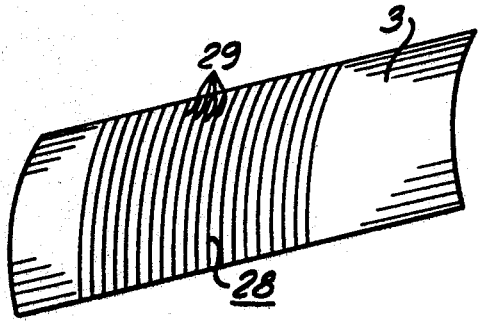
FIGURE 12 is a perspective view illustrating a mode filter separating $TE_{no}$ wave and $TM_{no}$ wave.

FIGURE 12 shows a mode filter on the electromagnetic wave beam transmission line which when necessary, causes the $TM_{no}$ wave for communication to attenuate but which causes no attenuation at all in the $TE_{no}$ wave for radar use. In FIGURE 12, 3 denotes the reflector-plate of the electromagnetic wave beam transmission line, 28 a mode filter consisting of a screen having a number of thin and parallel wires 29 of a conductor which are normal to the longitudinal direction of the reflector plate, z-axis, and which are long in the direction of y-axis, and arranged side by side in the z-direction at intervals sufficiently shorter than the wavelength. The mode filter of this construction causes no attenuation at all in TE wave propagating on the electromagnetic wave beam transmission line, but can cause remarkable attenuation in the TM wave.

Figure 13:
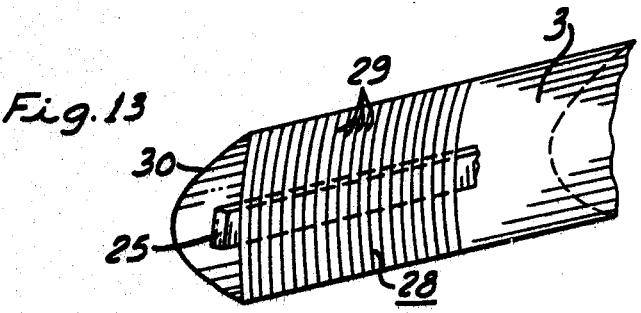
FIGURE 13 is a perspective view illustrating a coupler for the communication line provided with a mode filter.

FIGURE 13 shows a coupler for connecting the communication wave utilizing the mode filter of FIGURE 12. In FIGURE 13, the same numbers denote the same parts as in FIGURE 12. The coupler for communication wave shown in FIGURE 13 has the primary radiator 25 of the waveguide provided on the low loss transmission line in rear of the screen 29 which constitutes the mode filter. A wave radiated from the primary radiator is reflected by the parabolic cylinder reflector 30 and can pass through the screen 29 and excite the $TM_{no}$ wave on the electromagnetic wave beam transmission line. Naturally, the same structure as shown in FIGURE 13 may be used as a receiving antenna.

The following results have been obtained as a result of carrying out the present invention.

(1) The construction of the electromagnetic wave beam transmission line is as shown in FIGURE 2 and FIGURE 3.

Referring to FIGURE 3 the widest distance in the x-direction between the reflector plates 3a and 3b is 3,700 mm.

The width in the y-direction of the reflector plates 3a and 3b is 700 mm.

Referring to FIGURE 2, where a circular 132φ waveguide made of aluminum was used for the low loss transmission line for communication, attenuation constant was 2.4 db/km. at 7.5 gc./s.

(2) An instance is shown below where this composite transmission line comprising the electromagnetic wave beam transmission line and the low loss transmission line for communication is used for an obstacle detecting radar system or a train communication system.

(1) Values, for example, for the obstacle detecting radar system are as follows:

Peak value of output signal of radar transmitter, 9.4 gc. _____kw__ 40
Antenna excitation loss _____db__ 10
Obstacle reflection coefficient (lowest) _____db__ 30
Electromagnetic wave beam transmission loss for TE wave mode _____db/km__ 15

This transmission loss is larger than theoretical value (6 db/km.) because of installation roughness.

Under the above conditions:

Minimum detection distance _____ 100 m. or less.
Maximum detection distance _____ 3,000 m. or more.

(2) Values, for example, for the train communication system using frequency 7.5 gc./s. are as follows:

The coupling of the electromagnetic wave beam transmission line and the circular waveguide was effected by couplers at 100 meter intervals, with a repeater provided for every 10–15 km.

(1) Repeater with a gain of 40 db provided at intervals of 10–15 km.

(2) Electromagnetic wave beam transmission loss for TM wave mode—20 db/km.

This transmission loss is larger than theoretical value (14 db/km.) because of installation roughness.

(3) Circular waveguide transmission loss—4 db/km.

(4) Coupling loss between the train antenna and the electromagnetic wave beam transmission lines—30 db.

(5) Coupling of the coupler—60 db–20 db variable.

(6) Total level difference between transmitting and receiving—90 db.

(7) Transmission for TV, public telephone, operational telephone, etc. is possible by the FM communication system.

We claim:

1. In obstacle detecting and communicating systems for a moving vehicle, an electromagnetic wave beam transmission line consisting of parallel reflector plates positioned longitudinally along opposite sides of the vehicle path and having opposed concave surfaces.

2. The transmission line of claim 1 characterized by a $TE_{no}$ wave in said transmission line for obstacle detection radar and a $TM_{no}$ wave in said transmission line for wave communication.

3. The transmission line of claim 1 characterized by an electromagnetic wave exciting and receiving radiator consisting of a waveguide having intervally spaced openings along its longitudinal closure, and an arcuate reflector along its longitudinal closure, and an arcuate reflector spaced in cooperative relation with said waveguide.

4. The transmission line of claim 1, characterized by a rectangular waveguide coupled with said transmission line to excite and receive an electromagnetic wave therein and having a plurality of intervally spaced slits arranged along one of its walls and normal to the longitudinal axis of said waveguide and said transmission line, said slits spaced at intervals shorter than the wavelength of said wave.

5. The transmission line of claim 1 wherein said plates are characterized by a mode filter consisting of a plurality of intervally spaced parallel conductors normal to the longitudinal axis of said transmission line and being spaced at intervals shorter than the wavelength of the waves filtered therethrough.

6. The transmission line of claim 5 wherein said filter is characterized by a wave exciting and receiving radiator positioned behind said filter and consisting of a waveguide and an arcuate reflector spaced in cooperative relation with said waveguide.

7. An obstacle detecting and communicating system for a moving vehicle, a combination transmission line consisting of an electromagnetic wave beam transmission line having parallel reflector plates with opposed concave surfaces positioned longitudinally along opposite sides of the vehicle path, a low loss transmission line positioned parallel with said wave beam transmission line, electromagnetic wave transmission couplers intervally connecting said low loss transmission line with said wave beam transmission line.

8. The combination transmission line of claim 7 characterized by a $TE_{no}$ wave in said wave beam transmission line for obstacle detection radar and a $TM_{no}$ wave in said wave beam transmission line for wave communication.

9. The combination transmission line of claim 7 characterized by a wave exciting and receiving radiator consisting of a waveguide having intervally spaced openings along its longitudinal closure, and an arcuate reflector spaced in cooperative relation with said waveguide.

10. The combination transmission line of claim 7, characterized by an electromagnetic wave transmission coupler to excite and receive an electromagnetic wave in said wave beam transmission line consisting of a rectangular waveguide having a plurality of intervally spaced slits exposed to the interior of said wave beam transmission line and normal to the longitudinal axis of said waveguide and said wave beam transmission line, said slits spaced at intervals shorter than the wavelength of said wave.

11. The combination transmission line of claim 7 wherein said plates are characterized by a mode filter consisting of a plurality of intervally spaced parallel conductors normal to the longitudinal axis of said wave beam transmission line and being spaced at intervals shorter than the wavelength of the waves filtered therethrough.

12. The combination transmission line of claim 11 wherein said filter is characterized by a wave exciting and receiving radiator positioned behind said filter and consisting of a waveguide and an arcuate reflector spaced in cooperative relation with said waveguide.

13. The method of detecting objects in the path of a moving vehicle comprising the steps of exciting an electromagnetic wave for object detection radar between parallel reflector plates positioned along opposite sides of the vehicle path to propagate the wave therealong, receiving the electromagnetic wave after being reflected from an object in the vehicle path, and evaluating the information imparted to the reflected wave.

14. The method of detecting objects and communicating for moving vehicles comprising the steps of exciting a $TM_{no}$ mode wave for communication and a $TE_{no}$ wave for object detection radar between parallel reflector plates positioned along opposite sides of the vehicle path for propagating the wave therealong, receiving the $TM_{no}$ and $TE_{no}$ waves after being imparted respectively with communication information and object detection information, and thereafter discerning the information imparted to the waves.

15. The method of detecting objects and communicating for moving vehicles of claim 14 characterized by the step of propagating the excited $TM_{no}$ wave in a low loss transmission line connected at intervals to one of said reflector plates to permit periodical interception and excitation of the $TM_{no}$ wave by the moving vehicle.

No references cited.

RODNEY D. BENNETT, *Primary Examiner.*

M. F. HUBLER, *Assistant Examiner.*

UNITED STATES PATENT OFFICE
CERTIFICATE OF CORRECTION

Patent No. 3,392,388                                July 9, 1968

Tsuneo Nakahara et al.

It is certified that error appears in the above identified patent and that said Letters Patent are hereby corrected as shown below:

Column 8, lines 41 and 42, cancel "and an arcuate reflector along its longitudinal closure,".

Signed and sealed this 23rd day of December 1969.

(SEAL)
Attest:

Edward M. Fletcher, Jr.                      WILLIAM E. SCHUYLER, JR.
Attesting Officer                               Commissioner of Patents